United States Patent [19]

Guichard

[11] Patent Number: 4,683,538

[45] Date of Patent: Jul. 28, 1987

[54] METHOD AND SYSTEM OF CONTROLLING BRAKING ON A WHEELED VEHICLE

[75] Inventor: Jean Guichard, La Garenne Colombes, France

[73] Assignee: Messier Hispano Bugatti S.A., Montrouge, France

[21] Appl. No.: 679,718

[22] Filed: Dec. 10, 1984

[30] Foreign Application Priority Data

Dec. 9, 1983 [FR] France ................................. 83 19734

[51] Int. Cl.⁴ .......................... B60T 8/28; B60T 8/50; B60T 8/60
[52] U.S. Cl. ...................................... 364/426; 303/93; 303/97; 303/105
[58] Field of Search ..................... 364/426; 303/93, 95, 303/97, 100, 105, 106

[56] References Cited

U.S. PATENT DOCUMENTS

| | | | |
|---|---|---|---|
| 4,308,583 | 12/1981 | Musolino et al. | 364/426 |
| 4,367,529 | 1/1983 | Masclet et al. | 364/426 |
| 4,384,330 | 5/1983 | Matsuda et al. | 364/426 |
| 4,404,633 | 9/1983 | Goicoechea | 364/426 |
| 4,412,291 | 10/1983 | Amberg et al. | 364/426 |
| 4,430,714 | 2/1984 | Matsuda et al. | 364/426 |
| 4,430,715 | 2/1984 | Gentet et al. | 364/426 |
| 4,512,615 | 4/1985 | Kita et al. | 364/426 X |

*Primary Examiner*—Felix D. Gruber
*Attorney, Agent, or Firm*—Sughrue, Mion, Zinn, Macpeak, and Seas

[57] ABSTRACT

The method of controlling braking on a wheeled vehicle (such as an aircraft during landing) is applied to at least one wheel of the vehicle, which wheel has brakes and means for measuring the wheel speed. The method consists in a repeated two-period cycle comprising:

a measuring period (0-t1, t2-t3) in which the wheel brakes are not applied and in which the true speed (A) of the vehicle is measured by measuring the linear speed (D2) of the wheel; and a braking period (t1-t2, t3- ) in which the said measured true speed is used in conjunction with a deceleration value to estimate an approximate value of the vehicle speed (B1, B2), and in which the wheel brakes are applied in such a manner that the linear speed (D1, D3) of the wheel is caused to be less than the estimated speed of the vehicle by a predetermined function.

4 Claims, 2 Drawing Figures

METHOD AND SYSTEM OF CONTROLLING BRAKING ON A WHEELED VEHICLE

The present invention relates to a method of controlling braking on a wheeled vehicle, and more particularly controlling the braking of an aircraft while it is landing on a runway.

BACKGROUND OF THE INVENTION

When an aircraft makes contact with the ground it is travelling at high speed and it is necessary to bring it to a halt as quickly as possible in as short a distance as possible.

An aircraft generally lands by using running means, eg. wheels forming part of its landing gear, to make contact with the runway. The best known means for braking an aircraft once it has made contact with the ground consists in using friction brakes, eg. disk brakes, for absorbing energy. Such disk brakes are generally constituted by rotors and stators which are pressed against one another other by piston means driven by hydraulic fluid under pressure.

It should be mentioned that aircraft brakes present considerable design difficulties since they have to satisfy extremely severe criteria concerning even higher levels of safety and reliability than are required for other vehicles. To meet these criteria, a whole set of relatively complex devices are implemented to obtain aircraft deceleration in complete safety while preventing, for example, the wheels from locking, from sliding on puddles, etc.

The most usual braking method implemented on such vehicles consists in measuring the speed of the aircraft relative to the ground while it is running thereon, and in controlling the wheel braking by a servo system acting on the said measured aircraft speed.

Very briefly and without going into detail, this is achieved by ensuring that the equivalent linear speed of the braking wheels (generally the wheels on the main landing gear) should not drop to below some given quantity less than the aircraft ground speed. Experience has shown that this quantity should be about 15%. This kind of method provides adequate safety levels and optimizes braking forces.

In implementing this method, one of the problems that is encountered is the problem of measuring the true speed of the aircraft relative to the runway as accurately as possible. This is done by means of a sensor mounted on one of the aircraft wheels, generally the nose wheel. The nose wheel is in contact with the ground and is not used for braking, so in theory, its equivalent linear speed should be identical to the aircraft speed relative to the ground.

However, experience shows that using the nose wheel to measure ground speed is not always reliable. The nose wheel may slip or skid if the ground is wet or icy, or the nose wheel may itself be damaged for various reasons. This can result in the ground speed measurement being incorrect in some cases, and thus not always suitable. Unsuitable ground speed measurements will thus lead to the main landing gear brakes being servo-controlled to a wrong value, which can lead to disasters such as tire bursts or no braking at all.

Further, given current requirements of economy, speed, space saving, and shortness of runways, there is continuing demand for aircraft that can be halted ever more quickly in ever shorter distances.

To do this, it would be an advantage if all the wheels of the aircraft that are in contact with the ground could be used for braking, including the nose wheel. In which case, with all the wheels being braked, it is no longer easy to measure the true ground speed of the aircraft.

Preferred implementations of the invention thus provide a method of braking control in which the above-mentioned drawback is obviated, while still enabling all of the wheels of a vehicle, eg. an aircraft, which are in contact with the ground to be used for braking.

SUMMARY OF THE INVENTION

The present invention provides a method of controlling braking on a wheeled vehicle, the method being applied to at least one wheel of the vehicle, which wheel has brakes and means for measuring the wheel speed, the method consisting in a repeated two-period cycle comprising:

a measuring period in which the wheel brakes are not applied and in which the true speed of the vehicle is measured by measuring the linear speed of the wheel; and a braking period in which the said measured true speed is used in conjunction with a deceleration value to estimate an approximate value of the vehicle speed, and in which the wheel brakes are applied in such a manner that the linear speed of the wheel is caused to be less than the estimated speed of the vehicle by a predetermined function.

The present invention also provides a braking control system implementing the above-described method.

BRIEF DESCRIPTION OF THE DRAWINGS

An implementation of the invention is described by way of example with reference to the accompanying drawings, in which.

MORE DETAILED DESCRIPTION

As a preliminary point, it is stated that the invention is most particularly intended for use in controlling the braking of aircraft during landing on an airfield runway.

Figure 1:
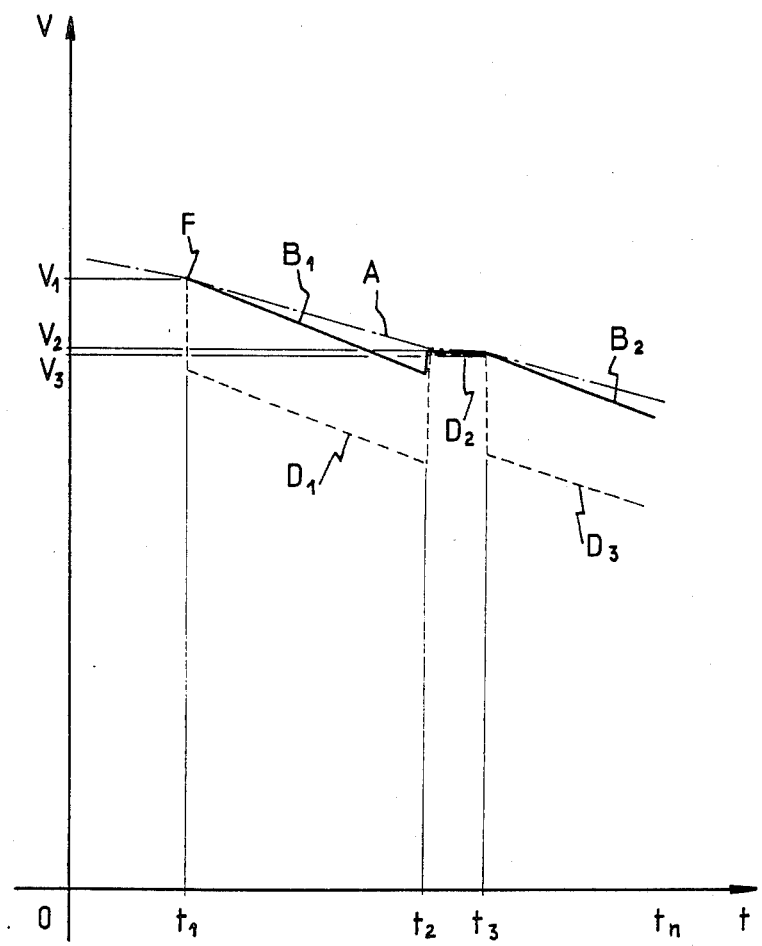
FIG. 1 is a graph showing a set of curves for explaining the method of the invention.

The following description of the method makes reference to FIG. 1 which is a graph of a set of curves giving different values of speed v as a function of time t as an aircraft runs along a runway during landing. Various instants in the time taken by the aircraft to land are marked $t_1, t_2, t_3, \ldots t_n$. Naturally the distance travelled along the runway by the aircraft can readily be determined from the given speed.

Thus, at the origin O the aircraft is considered as making contact with the ground and then running along the runway without any braking action being applied for a period of time up to instant $t_1$. Any reduction of speed that takes place in this initial un-braked period is due solely to various uncontrolled sources of friction such as wind resistance.

At instant $t_1$, the pilot may control the application of braking to all the wheels of the landing gear. The speed $v_1$ represents the true speed of the aircraft at the instant that braking is applied. This true speed $v_1$ of the aircraft is readily determined, eg. by means of a sensor co-operating with one of the wheels of the landing gear as it runs along the ground and prior to any kind of braking being applied, eg. by disk brakes as mentioned above. From instant t1 the wheel or wheels are braked to reduce the linear wheel speed to a speed which is about 15% less than the true speed of the aircraft. This takes place over a period of time extending between instants t1 and t2, during which time the aircraft slows down. It is not always possible to discover the true speed of the aircraft after point F, ie. once the brakes have been applied. However, it is possible to calculate a value of the speed v which is a reasonably good approximation to the true speed:

v=v1+f(t2−t1) where f is the acceleration (ie. it has a negative value during deceleration), and where v is plotted as curve B1.

To obtain optimal braking force at any moment, it is preferable never to allow the linear wheel speed to drop below a speed D1 which is generally about 15% less than the speed of the aircraft. The figure of 15% is given as a typical example, but it may be increased under favorable circumstances as a function of various parameters, in particular the configuration of the landing gear or of the runway. To avoid going beyond the limit, it is necessary to measure the aircraft's true speed from time to time, and thus after a given lapse of braking time given above as t2−t1, the aircraft wheel brakes are released. Since it is no longer braked, the wheel very rapidly reaches the true speed at which the aircraft is travelling.

Thus, on the graph, between instants t2 and t3 the wheel speed D2 is shown returning instantly to the aircraft's true speed A. During the period of time between t2 and t3 the true speed of the aircraft can be measured since the wheel speed matches the aircraft speed v2. Thus, from a new estimate of the aircraft's speed B2 is calculated on the basis of the new measured speed and the deceleration. During a subsequent period of time t3 to t4 the estimate B2 is used as an approximation to the true aircraft speed, and so from instant t3 onwards the wheel is again braked and its linear speed D3 is controlled as a function of the estimated speed B2.

Thus, from period to period it is possible to control the aircraft braking on the basis of an estimate of the aircraft speed, which estimate is periodically updated during relatively short periods in which the brakes are released. This process can be repeated until the aircraft comes to rest.

The above-described method may be modified to optimize braking. For example, the value given to the deceleration may be an arbitrary constant, it may be preprogrammed as a function of speed, or it may be deduced as a function of the braking force as measured by an accelerometer.

Likewise it may be advantageous to vary the period between updating measurements of the true speed. For example, the period may be varied as a function of the update value, which function is approximately one of inverse proportion.

Finally, in the above-described method only one wheel of the aircraft is mentioned: clearly the method is advantageously applied to all of the aircraft wheels as mentioned in the introduction. In this case, the measurements of the true speed can be made taking speed measurements from a plurality of wheels and determining which wheel at the instant of measurement is going fastest, and then, for example, giving priority to that wheel's release.

Figure 2:
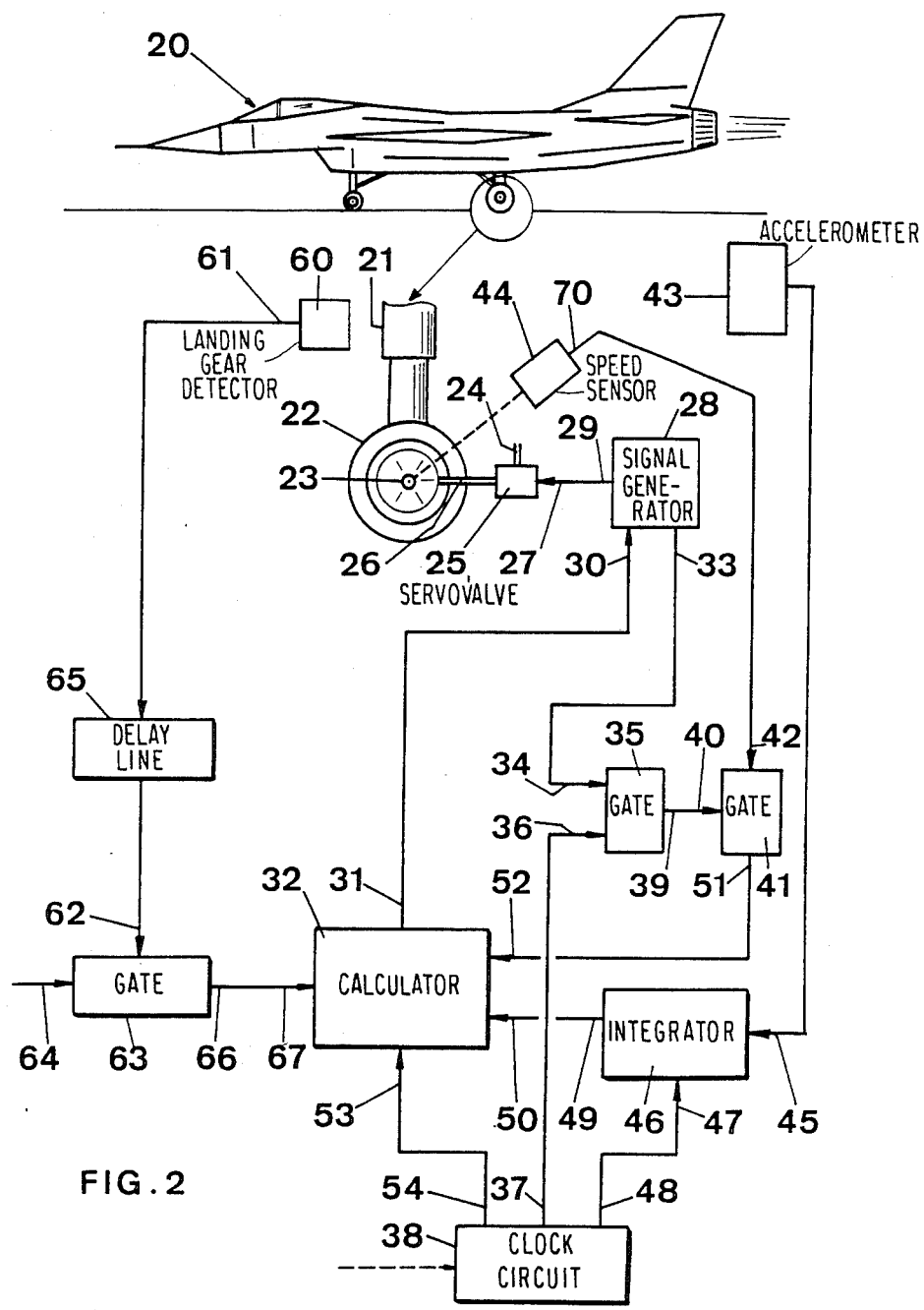
FIG. 2 is a block diagram of a braking control system for implementing the method.

FIG. 2 is a block diagram of a particular embodiment of a system for performing the above braking control using simple means which are known per se.

The system shown applies to the braking of an aircraft 20 having landing gear 21 including running means such as a wheel 22 which is associated with a disk brake 23. The disk brake 23 is generally driven by fluid under pressure from a tank (not shown) but connected by a duct 24 to the input of a servovalve 25 having an outlet duct 26 feeding pistons for thrusting the brake's disks against one another. The servovalve 25 has a control input 27 connected to signal generator means 28, eg. a controllable generator suitable for supplying an electrical signal at its output 29 which, when applied to the input 27 of the servovalve 25, enables it to open and cause fluid under pressure from the duct 24 to be applied to the piston controlling the disk brakes.

Generally the servovalve provides a free passage when at rest, ie. when receiving a control signal "O". In this position it constantly passes the braking pressure as controlled by the pilot or by any other means. When a "1" value signal is applied to the servovalve it takes off the brakes by preventing fluid pressure from reaching the brake acturator piston.

The control signal generator means 28 itself has a control input 30 connected to receive a signal generated by a calculator 32. The generator 28 also has another output 33 which is suitable for delivering a signal representative of its state, ie. whether the generator 28 is being controlled to apply braking or to prevent braking. This output 33 is connected to an input 34 of a two input logic AND gate 35 whose other input 36 is connected to the output 37 of a clock circuit 38 suitable for emitting signals defining predetermined time periods. The output 39 from the AND gate 35 is applied to one input 40 of a second two-input logic switch gate 41 whose other input 42 is connected to the output 70 of a speed sensor 44 associated with the wheel 22.

The logic switch gate 41 is controlled by the signal on its input 40 to pass or not to pass the value of the signal applied to its input 42. This is explained in greater detail below in the description of the operation of the system. In addition, the system includes an accelerometer 43, which is generally disposed on board the aircraft 20, eg. in the form of a rate gyro having an output suitable for delivering a signal representative of the acceleration (negative values indicating deceleration) and connected to the input 45 of an integrator 46 having an integration period control input 47 connected to an output 48 from the clock circuit 38.

A landing gear detector 60 detects contact of the landing gear 21 with the ground, and outputs a signal over line 61, which signal is delayed in delay line 65 before being passed to a gate 63. The gate 63 also receives a signal, over line 64, indicative of brake application by the pilot, as will be described below.

So long as the aircraft remains on the runway, the signal at the input 62 remains constant during landing, thus enabling the pilot (human or automatic) to apply the brakes at any desired instant by applying a singal to the input 64 of the gate 63, which signal is then allowed to pass to the control input 67 of the calculator 32. During the initial brief period as determined by the delay line 65 for example, the speed sensor 44 delivers an output signal representative of the true speed of the aircraft relative to the runway, since the wheel is not braked during the initial period of contact. This speed is shown as v1 in FIG. 1.

On the basis of this speed supplied by the speed sensor 44, the calculator generates a signal for controlling the brake means so as to reduce the speed of the aircraft during a predetermined period of time t1 to t2 as given by the clock generator 38.

After the first predetermined period, the clock circuit 38 applies a signal to the calculator 32, the AND gate 35 and the integrator 46, to stop braking so that the wheel 22 takes up a linar speed equivalent to the true speed of the aircraft 20. During this short interval, the aircraft speed is again measured by the speed sensor 44 so as to enable the calculator to estimate another reference speed during a second period on the basis of signals given by the accelerometer and using the equation given above.

The estimated aircraft speed is used by the calculator 32 to activate the brakes in such a manner that the wheel speed is less than the aircraft speed but not more than some given amount less, eg. 15% less as mentioned above.

The clock circuit 38 is programmed to define successive periods during which the wheel is braked and then released for taking a new measurement of the true speed of the aircraft. This then enables the next braking period to be based on an updated estimate of the true speed, etc.

What is claim is:

1. A method of controlling braking on a wheeled vehicle, at least one wheel having braking means maintainable in selective contact therewith, and means for sensing the speed of said at least one wheel, wherein during a period of application of said brake means, the brake means are actuated so as to slow down the said at least one wheel with respect to a vehicle speed, said brake means being actuated only for sufficient length of time to ensure that the wheel speed is maintained within a predetermined percentage of the vehicle speed, said vehicle speed being calculated in accordance with an initial sensed vehicle speed and a predetermined acceleration value, said method comprising the following steps:
   (i) sensing actual vehicle speed by sensing the speed of said at least one wheel, said sensing step being performed for a first predetermined period during which brake means are not applied to said at least one wheel;
   (ii) applying said braking means to said at least one wheel for a second predetermined period that is much longer than said first predetermined period, during which said vehicle speed is calculated from sensed vehicle speed and said predetermined acceleration value, wherein said second predetermined period is of sufficient length that said wheel speed is maintained within a predetermined percentage of said estimated vehicle speed; and
   (iii) repeating said steps (i) and (ii) until a desired speed of said vehicle is achieved.

2. A method as claimed in claim 1, wherein said desired speed of the vehicle is zero.

3. A method according to claim 1 wherein said second predetermined period is controlled in accordance with a predetermined period set by clocking means and calculating means.

4. A method according to claim, wherein the duration of the braking periods is controlled as a function of the duration of the preceding braking period.

* * * * *